US011675730B2

(12) United States Patent
Engl et al.

(10) Patent No.: US 11,675,730 B2
(45) Date of Patent: Jun. 13, 2023

(54) USB MODULE

(71) Applicant: MD ELEKTRONIK GmbH, Waldkraiburg (DE)

(72) Inventors: Rudolf Engl, Ampfing (DE); Stefan Fuchs, Ampfing (DE); Klaus Bramhofer, Tuessling (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 0 days.

(21) Appl. No.: 17/494,854

(22) Filed: Oct. 6, 2021

(65) Prior Publication Data

US 2022/0138141 A1   May 5, 2022

(30) Foreign Application Priority Data

Nov. 4, 2020   (DE) ...................... 10 2020 129 017.9

(51) Int. Cl.
*G06F 13/42*  (2006.01)
*G06F 13/40*  (2006.01)

(52) U.S. Cl.
CPC ...... *G06F 13/4282* (2013.01); *G06F 13/4068* (2013.01)

(58) Field of Classification Search
CPC .......................... G06F 13/4282; G06F 13/4068
See application file for complete search history.

(56) References Cited

U.S. PATENT DOCUMENTS

| 8,990,592 | B2 | 3/2015 | Kaestner | |
|---|---|---|---|---|
| 2016/0172793 | A1* | 6/2016 | Chen | H01R 13/6471 439/607.05 |
| 2016/0308527 | A1* | 10/2016 | Kim | H03K 19/018592 |
| 2017/0017595 | A1* | 1/2017 | Schnell | G06F 13/4286 |
| 2017/0244186 | A1* | 8/2017 | Dumpler | H01R 13/5202 |
| 2017/0372767 | A1* | 12/2017 | Kang | G11C 11/4087 |
| 2018/0101493 | A1* | 4/2018 | Tominaga | G06F 13/4081 |
| 2018/0189222 | A1* | 7/2018 | Srivastava | G06F 13/287 |
| 2018/0267921 | A1* | 9/2018 | Yen | G06F 13/382 |
| 2018/0275732 | A1* | 9/2018 | Chen | G06F 1/266 |
| 2019/0082141 | A1* | 3/2019 | Chen | H04N 7/104 |

* cited by examiner

*Primary Examiner* — Henry Tsai
*Assistant Examiner* — Harry Z Wang
(74) *Attorney, Agent, or Firm* — Leydig, Voit & Mayer, Ltd.

(57) ABSTRACT

A USB module includes a first USB port configured to connect a first USB-compatible device with a first USB cable and a USB plug, and a second port configured to connect a second USB-compatible device with a second USB cable. The USB cables are multi-core and respectively comprise first and second configuration lines. An interface is arranged between the first USB port and the second port in a housing interior of a housing of the USB module. The interface makes at least the first configuration line connectable to the second configuration line. The interface comprises a semiconductor module configured to reference to a ground potential of the USB module at least one output signal at the USB module on a configuration connection between the first and second configuration lines.

10 Claims, 6 Drawing Sheets

USB MODULE

CROSS REFERENCE TO RELATED APPLICATION

This application claims benefit to German Patent Application No. DE 10 2020 129 017.9, filed on Nov. 4, 2020, which is hereby incorporated by reference herein.

FIELD

The present invention relates to a universal serial bus (USB) module.

BACKGROUND

The USB is a standardized serial bus system for connecting a computer to a device external to the computer. The USB connection is wired and, in addition to data, charging currents can also be transmitted. The level of a charging current transmitted via a USB cable is limited in order to avoid negative effects on the data transmission. The limitation of the charging current in turn determines a maximum permissible USB cable length. The greater the permissible charging current, the shorter the maximum permissible USB cable length. In the case of a direct USB connection between a computer and a device external to the computer, the relevant USB cable length is between the USB ports or USB modules on the computer and the device external to the computer.

USB-based data transmission is used in many fields, for example also in the field of automotive technology. In contrast to the computer connection described above, a USB module in a vehicle is generally remote from the on-board main electronic system to which the external device is to be connected. The reasons lie in the arrangement of the components in the vehicle due to installation space and/or thermal limitations, as a result of which it is often more practical to arrange a USB module remotely from the main electronic system. The main electronic system often has one or more of the group of DC/DC converter, USB Hub and/or head unit. The distance between the on-board main electronic system and the USB module in the vehicle is established via an additional USB cable connection, which is frequently attached under coverings in a non-visible manner. The entire USB cable length between the on-board main electronic system and the external device is composed of the USB cable length between the external device and the USB module and the USB cable length between the USB module and the on-board main electronic system.

As the use of external devices in the vehicle increases, the demands for higher charging currents that are to be conducted via a USB connection also increase. However, a high charging current, in particular in the case of longer USB cables, can lead to an undesired high offset, i.e., voltage drop, between the ground potentials of a USB power source, i.e., of the on-board main electronic system, and a USB current sink, i.e., the connected external device.

This offset, also known as so-called ground drop, can negatively impair data transmission if the differences are too high, in particular starting from a ground drop of more than 250 mV. The interference relates in particular to USB 2.0 communication and communication via a CC line of a USB type C interface. According to the USB standard, the threshold value of 250 mV is actually defined exclusively for the USB cable between the USB module and the external device. Accordingly, the remote solutions described above, with which the main electronic system is arranged remotely from the USB module, generally function only because short USB cables are used between the USB module and the external device, and the complete ground drop of 250 mV is not utilized on this USB cable. In the case of longer USB cables between the USB module and the external device and/or higher charging currents, however, it is likely that the threshold value of 250 mV is already utilized on this cable alone, so that interferences in the data transmission between external device and main electronic system can occur in conjunction with the USB cable between the main electronic system and the USB module.

U.S. Pat. No. 8,990,592 B2 describes a level shifter that modifies a voltage level on a USB data line, for example in order to compensate for a so-called ground offset effect. The level shifter can be part of a connection power regulator that enables an adaptive shift in the signal level corresponding to the current levels drawn by a device, for example during charging, on the supply line. By varying the voltage levels at the data D+ and D− lines corresponding to the drawn current intensities, the performance of USB host ports and USB hub ports can be significantly increased. A permanent shift or regulation is, however, necessary in this case.

SUMMARY

In an embodiment, the present disclosure provides a USB module. A first USB port is configured to connect a first USB-compatible device with a first USB cable and a USB plug, wherein the first USB cable is multi-core and comprises at least one first configuration line. A second port is configured to connect a second USB-compatible device with a second USB cable, wherein the second USB cable is multi-core and comprises at least one second configuration line. A housing has a housing interior, and an interface is arranged between the first USB port and the second port in the housing interior. The interface makes at least the at least one first configuration line connectable to the at least one second configuration line. The interface comprises at least one semiconductor module that is configured to reference to a ground potential of the USB module at least one output signal at the USB module on a configuration connection between the at least one first configuration line and the at least one second configuration line.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
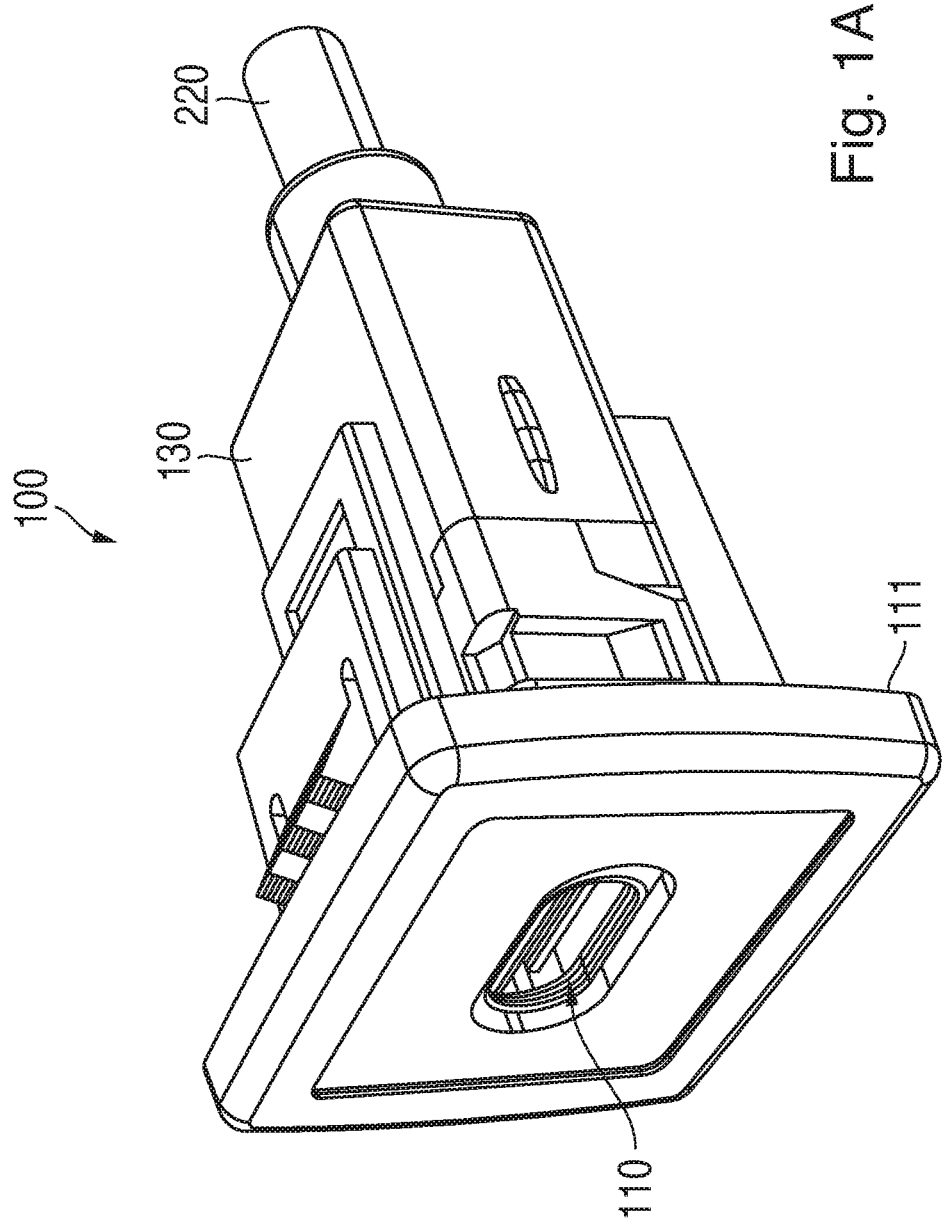
FIG. 1A shows a perspective view of an embodiment of a USB module with a cover according to the present invention.

In an embodiment, the present invention provides a USB module that enables reliable data transmission between a main electronic system and a connected external device in a simple manner even in the case of long USB cable connections and/or higher charging currents.

The USB module according to an embodiment of the present invention that enables reliable data transmission between a main electronic system and a connected external device in a simple manner even in the case of long USB cable connections and/or higher charging currents comprises a first USB port for connecting a first USB-compatible device with a first USB cable and a USB plug, wherein the first USB cable is multi-core and comprises at least one first configuration line. Furthermore, a second port for connecting a second USB-compatible device with a second USB cable, wherein the second USB cable is multi-core and comprises at least one second configuration line. In addition, the USB module comprises a housing with a housing interior, wherein an interface between the first USB port and the second port is arranged in the housing interior, and the interface makes at least the first configuration line connectable to the second configuration line. And the interface comprises at least one semiconductor module that is configured to reference at least one output signal at the USB module to a ground potential of the USB module on a configuration connection between the first configuration line and the second configuration line.

The first USB port is preferably a USB socket, in particular of USB type C, into which a corresponding USB plug can be inserted. In an alternative embodiment, the USB module can also be a USB plug. The USB module is based on a standardized USB cable connection and is widely used. Many external devices can be connected to an electronic system via a USB connection; the USB module can thus be used in a vehicle in many ways.

The interface is preferably configured in the form of a circuit board, so that the integration of further electronic components, such as the semiconductor module, can be implemented in a simple manner. The semiconductor module can be integrated into the interface when the interface is manufactured, or can alternatively be integrated afterwards. The integration of the semiconductor module in the interface enables a simple structure of the USB module, in particular without the external dimensions of the USB module having to be changed.

The referencing of the output signals at the USB module of a configuration connection between two configuration lines to the ground potential of the USB module leads to the ground drop of the preceding USB cable, as viewed in the signal direction, to be compensated at the USB module. The compensation has the advantage that the full permissible ground drop of 250 mV is available for the subsequent USB cable, as viewed in the signal direction. In the end, the compensation leads to an advantage that longer USB cables and/or higher charging currents are possible over the entire USB cable length between the main electronic system and the connected external device.

Optionally, the at least one semiconductor module is alternatively designed to reference the output signal at the USB module to the ground potential of the USB module on a configuration connection between the first configuration line and a third configuration line.

In a preferred embodiment, the first USB cable between the external device and the USB module has a configuration line CC, while the second USB cable between the USB module and the main electronic system in a preferred embodiment has two configuration lines CC1, CC2. Depending on which orientation the USB plug of the first USB cable has in the USB module, the configuration connection is made via the configuration lines CC1-CC or alternatively CC2-CC. This enables the use of the configuration connection independently of the hardware connection of the configuration lines.

Optionally, the interface with the at least one semiconductor module is arranged on a paddle card. The arrangement of the interface with the semiconductor module on a paddle card enables separate pre-installation independently of the integration in the USB module. Separate pre-installation can be advantageous in terms of process technology and can bring about a simplified and/or faster integration in the USB module.

Optionally, the first USB cable furthermore comprises at least one first and one third data line, and the second USB cable furthermore comprises at least one second and one fourth data line, and both the first and third data lines and the second and fourth data lines are guided to the at least one semiconductor module. Data can be exchanged between the main electronic system and the external device via the data lines. The data exchange can take place in parallel to a charging current. In particular, the charging current does not interfere with the data exchange on the data lines.

Optionally, the at least one semiconductor module is designed to process using signaling technology a first and/or a third data signal received via the first data line and to be output via the second data line and/or received via the third data line and to be output via the fourth data line. Due to the USB cables used, signal falsifications may occur in the data signals. The signal falsifications can be corrected with the aid of the semiconductor module, so that the respective data signal arrives minimally falsified at its target. The correction is also referred to as signal refreshing and improves signal transmission.

Optionally, the at least one semiconductor module is designed to process using signaling technology a second and/or a fourth data signal received via the second data line and to be output via the first data line and/or received via the fourth data line and to be output via the third data line. The signal processing has the aforementioned advantages for the alternative data connections.

USB 2.0 communication is optionally used for signals on the first, second, third and/or fourth data lines. USB 2.0 communication is a common and widely used USB standard. The use of this standard enables communication with a plurality of external devices.

Optionally, the USB module is furthermore configured to conduct a charging current that flows from a second USB-compatible device that can be connected to the USB module to at least one connectable first USB-compatible device (300). The functionality that a charging current flows via the USB module is a sought-after property in order to simultaneously charge the connected external device during its use.

Optionally, the at least one semiconductor module has an ASIC. An ASIC can be adapted directly to the desired data processing function. The data processing speed is generally optimized, so that an extremely high speed is achieved. The power consumption is generally significantly lower than other data processing modules, such as microcontrollers.

Optionally, the USB module is of USB type C. A USB type C module is constructed mirror-symmetrically, so that a USB plug can be inserted into the USB socket with two orientations. This increases the ease of use of the USB connection.

Some embodiments are described below:

The USB module is, for example, of USB type C (also known as "USB C"). Accordingly, the first configuration line is, for example, a so-called CC line, and the second configuration line is a CC1 line, where CC is the abbreviation for configuration channel. Signals for negotiating the charging power supply (so-called power negotiation) are exchanged via a CC line. In another embodiment, the USB module can be of a different USB type.

In one embodiment, the first USB port is a USB socket designed to receive a USB plug. The USB plug terminates the first USB cable at one end. The first USB cable establishes a USB connection from the USB module to a first USB-compatible device, for example to a USB end device, which is detachably arranged in a vehicle.

In one embodiment of the USB socket, the interface in the housing interior connects all lines of the first USB cable to corresponding lines of the second cable. In this case, at least the first and second configuration lines are connected via the at least one semiconductor module.

In one embodiment, the second port is designed to receive the lines of the multi-core second USB cable. In a preferred embodiment, the USB module terminates the second USB cable. The lines of the second USB cable can be soldered directly on the interface or connected to the interface by plug connections. The second USB cable is preferably installed in a vehicle and establishes a connection from the USB module to a second USB-compatible device, for example to a USB hub in the vehicle.

The first USB cable preferably has a length greater than 0.5 m, more preferably greater than 0.75 m, even more preferably greater than 1 m and most preferably greater than 1.25 m. The second USB cable preferably has a length greater than 1 m, more preferably greater than 1.5 m, even more preferably greater than 2 m and most preferably greater than 2.5 m.

According to one embodiment, the at least one semiconductor module is designed, in particular, to reference to the ground potential of the USB module a first output signal at the USB module on the first configuration line resulting from a first input signal at the USB module on the second configuration line. As well as in the opposite signal direction, to reference to the ground potential of the USB module a second output signal at the USB module on the second configuration line resulting from a second input signal at the USB module on the first configuration line.

In an alternative embodiment, the at least one semiconductor module is configured to reference to the ground potential of the USB module a third output signal at the USB module on the first configuration line resulting from a third input signal at the USB module on a third configuration line. As well as in the opposite signal direction, to reference to the ground potential of the USB module a fourth output signal at the USB module on the third configuration line resulting from a fourth input signal at the USB module on the first configuration line.

In this way, a ground drop along the second USB cable can be compensated in the event of a signal path from the second USB-compatible device to the first USB-compatible device, so that the maximum permissible ground drop can also be completely utilized by the first USB cable. Overall, irrespective of the signal direction, the maximum permissible ground drop can be utilized on the first and the second USB cable.

According to one embodiment, the first USB cable furthermore comprises at least one first data line, and the second USB cable furthermore comprises at least one second data line, wherein both the first data line and the second data line are guided to the at least one semiconductor module.

In a preferred embodiment, the at least one semiconductor module is designed to process using signaling technology a first data signal received via the first data line and to be output via the second data line. The at least one semiconductor module is likewise designed to process using signaling technology a second data signal received via the second data line and to be output via the first data line.

In addition, further advantages and features of embodiments of the present invention are apparent from the following description of preferred embodiments. The features described there and above can be implemented alone or in combination, provided that the features do not contradict. The preferred embodiments are described below with reference to the accompanying drawings.

Figure 1B:
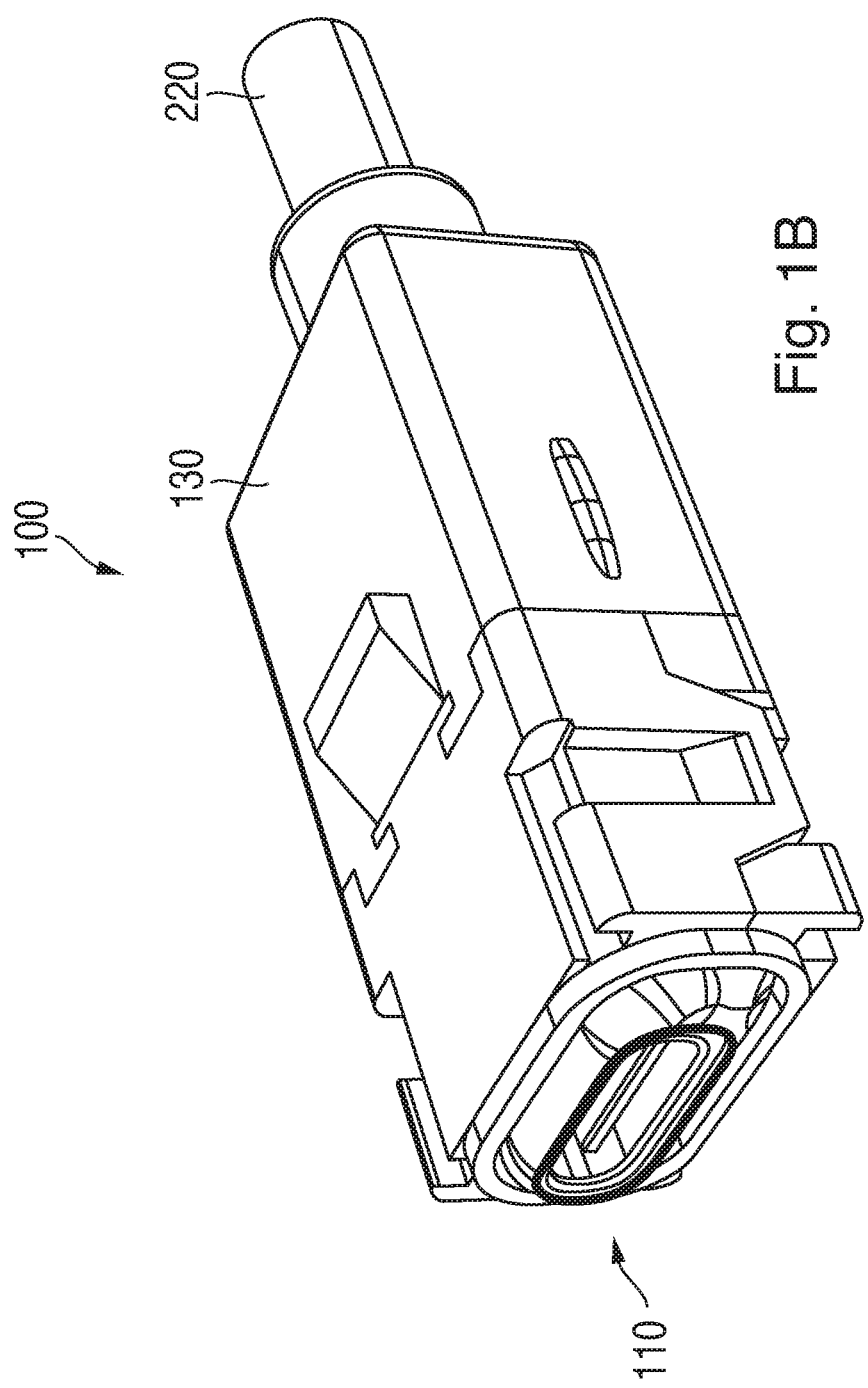
FIG. 1B shows a perspective view of an embodiment of a USB module without a cover according to the present invention.

FIGS. 1A and 1B show a perspective view of a USB module 100 with and without a cover, respectively. The USB module 100 comprises a first USB port 110 for connecting a first USB-compatible device 300 with a first USB cable 210, wherein the first USB cable 210 is multi-core and comprises at least one first configuration line 211 (see FIG. 3). A second port 120 (see FIG. 2) for connecting a second USB-compatible device 200 (see FIG. 3) with a second USB cable 220 is further provided, wherein the second USB cable 220 is also multi-core and comprises at least one second configuration line 221.

The USB module 100 also comprises a housing 130, which has an interface 150 between the first USB port 110 and the second port 120 in a housing interior 131 (see FIG. 2), wherein the interface is configured to connect the first configuration line 211 to the second configuration line 221.

The interface 150 comprises at least one semiconductor module 151, wherein the at least one semiconductor module 151 is designed to modify an input signal on the second configuration line 221 at the USB module 100, such that a resulting output signal on the first configuration line 211 at the USB module 100 relates to the ground potential of the first USB port 110. In the opposite signal direction, the at least one semiconductor module 151 is configured to modify an input signal on the first configuration line 211 at the USB module 100, such that a resulting output signal on the second configuration line 221 at the USB module 100 relates to the ground potential of the second port 120. The ground potential of the first USB port 110 and of the second port 120 corresponds to the ground potential GND-2 of the USB module 100.

In a preferred embodiment, the interface 150 connects all lines of the first USB cable 210 to corresponding lines of the second USB cable 220 in the housing interior. In this case, at least the two configuration lines 211 and 221 are connected via the at least one semiconductor module 151.

The USB module 100 shown in the figures is of USB type C. Accordingly, the first configuration line 211 is a CC line. The second configuration line 221 is a CC1 line. Signals for negotiating the charging power supply (so-called power negotiation) are exchanged via a CC line connection. In another embodiment, the USB module 100 can also be of a different USB type.

The first USB port 110 is a USB socket designed to receive a USB plug 230. The USB plug 230 terminates the first USB cable 210. The first USB cable 210 leads to a first USB-compatible device 300, for example a USB end device, which is arranged or installed in a vehicle. In one embodiment, the first USB port 110 is protected by a cover 111 (see FIG. 1A) or, in another embodiment, does not have a cover 111 (see FIG. 1B).

The second port 120 (see FIG. 2) is designed to receive several lines of the multi-core second USB cable 220. The USB module 100 terminates the second USB cable 220 and is preferably firmly connected to the second USB cable 220. The second cable 220 is preferably firmly installed in a vehicle and leads to a second USB-compatible device 200, for example a USB hub and/or a main electronic system.

Figure 4:
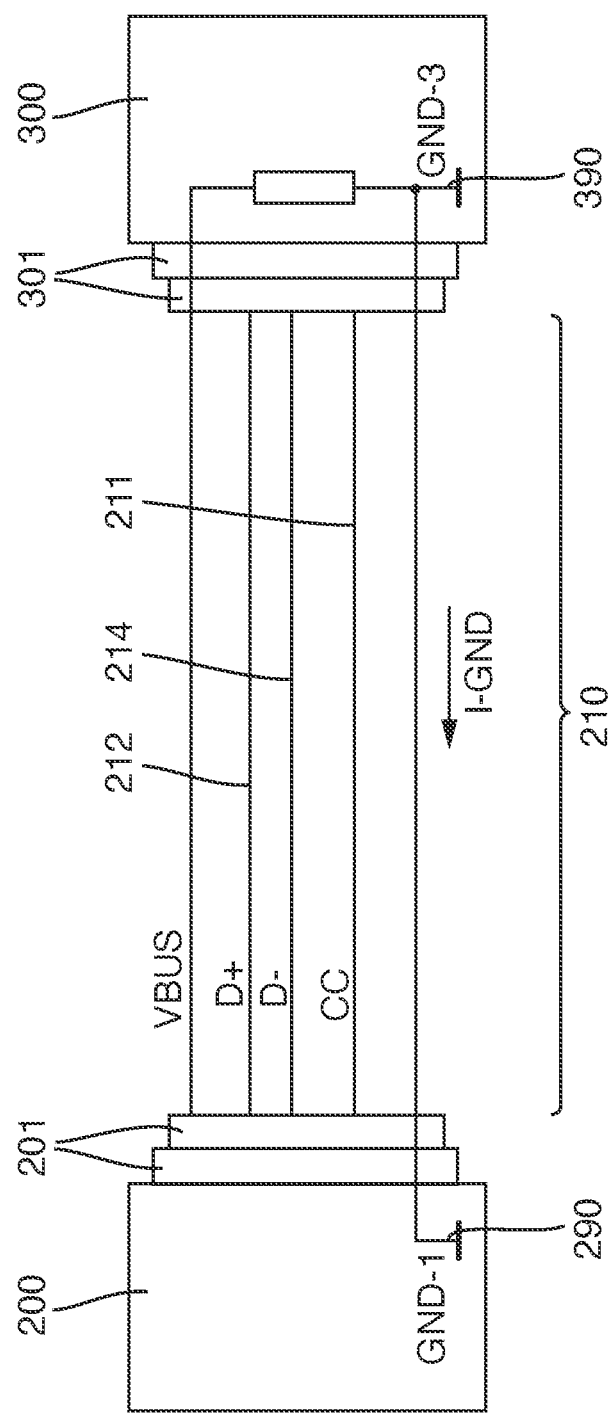
FIG. 4 shows a schematic representation of an embodiment of a USB connection between a computer and a connected external device according to the present invention.

FIG. 4 shows a schematic representation of a USB connection between a computer 200 and a connected external device 300. In this structure, the USB module or USB coupling element 201 is directly connected to the main electronic system 200, i.e., the computer. During a signal transmission via the first USB cable 210, a ground drop occurs only across the first USB cable 210. In this structure, the permissible maximum ground drop can be completely utilized by the first USB cable 210.

Figure 5:
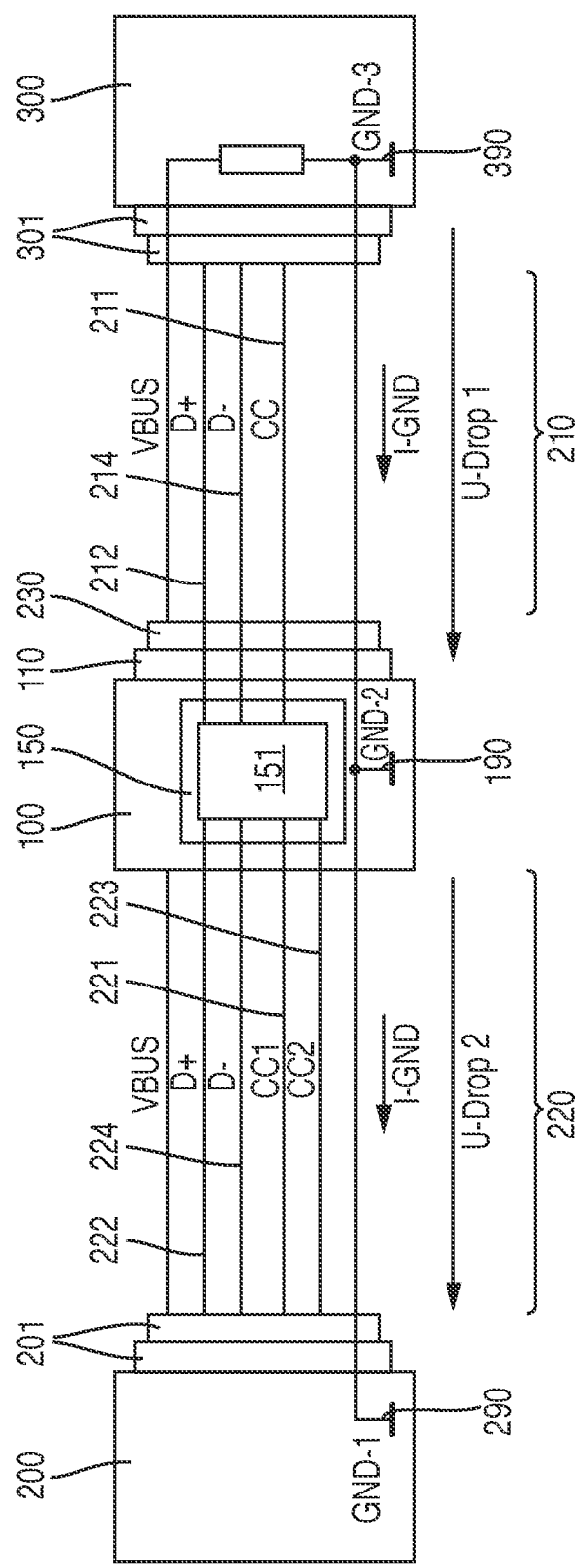
FIG. 5 shows a schematic representation of an embodiment of a USB connection in a vehicle between a main electronic system and a connected external device according to the present invention.

In contrast to FIG. 4, FIG. 5 shows a schematic representation of an embodiment of a USB connection in a vehicle. In this case, the main electronic system 200 is arranged remotely from the USB module 100 and is connected to the USB module 100 by a second USB cable 220. The ground references are described with reference to FIG. 5 as follows: A configuration signal from the first USB-compatible device 300 to the USB module 100 is initially referenced to the ground potential GND-3 of the first USB-compatible device 300. A first ground drop U-Drop 1 occurs when the configuration signal is transmitted via the first USB cable 210. According to one embodiment, the at least one semiconductor module 151 is designed to reference to the ground potential GND-2 of the USB module 100 the configuration signal to be forwarded to the second USB-compatible device 200. A second ground drop U-Drop 2 occurs when the configuration signal is forwarded from the USB module 100 to the second USB-compatible device 200. However, as a result of referencing the configuration signal to the ground potential GND-2 of the USB module 100 in the semiconductor module 151, the two ground drops U-Drop 1 and U-Drop 2 are not added, but the first ground drop U-Drop 1 is compensated, so that even in the cable connection between the USB module 100 and the second USB-compatible device 200, only the ground drop 2 counts. The two ground drops U-Drop 1 and U-Drop 2 can thus separately have a maximum ground drop, in particular up to 250 mV. In the opposite signal direction, a configuration signal from the second USB-compatible device 200 is initially referenced to the ground potential GND-1 of the second USB-compatible device 200.

In this way, in the case of a signal direction from the main electronic system 200 in the vehicle to the external device 300, a ground drop along the second USB cable 220 can be compensated, so that the maximum permissible ground drop can be completely utilized separately by the first and the second USB cable 210, 220. The same also applies in the reverse signal direction.

Not only the two configuration lines 211, 221 can be guided to the semiconductor module 151 or to the semiconductor modules. The first USB cable 210 furthermore comprises at least one first data line 212, and the second USB cable 220 furthermore comprises at least one second data line 222, wherein both the first data line 212 and the second data line 222 are guided to the at least one semiconductor module 151.

Figure 3:
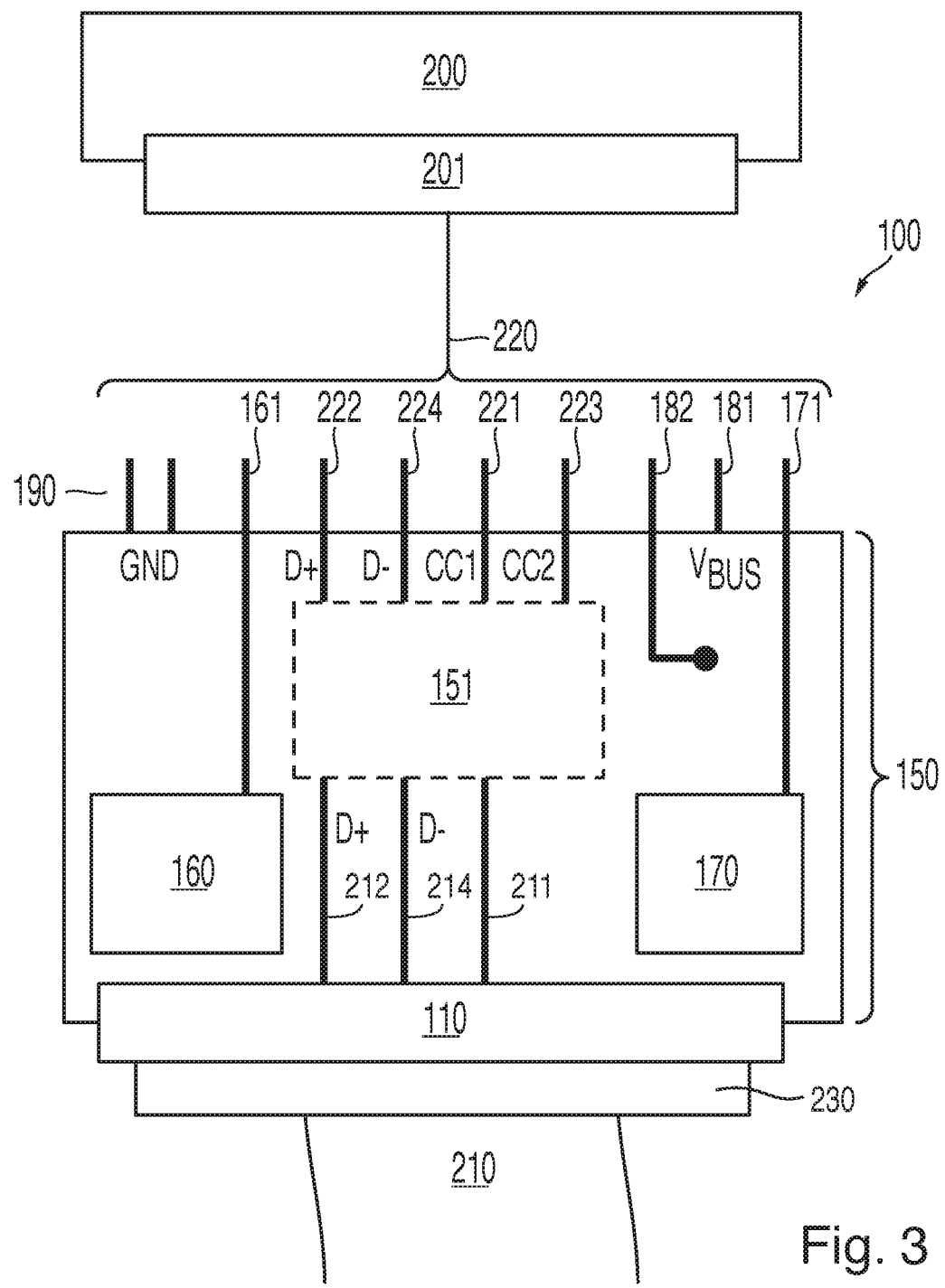
FIG. 3 shows a schematic representation of an interface in an embodiment of the USB module according to the present invention.

Further lines, for example a further configuration line 223 and further data lines 214 and 224 of the two USB cables 210 and 220, may also be guided to the semiconductor module 151, the function of which can also be provided by several semiconductor modules as shown in FIG. 3.

The data lines 212, 214, 222 and 224 are the D+ or D− lines of the first and second USB cables 210, 220 (also known by the designations "Dp1," "Dn1").

Figure 2:
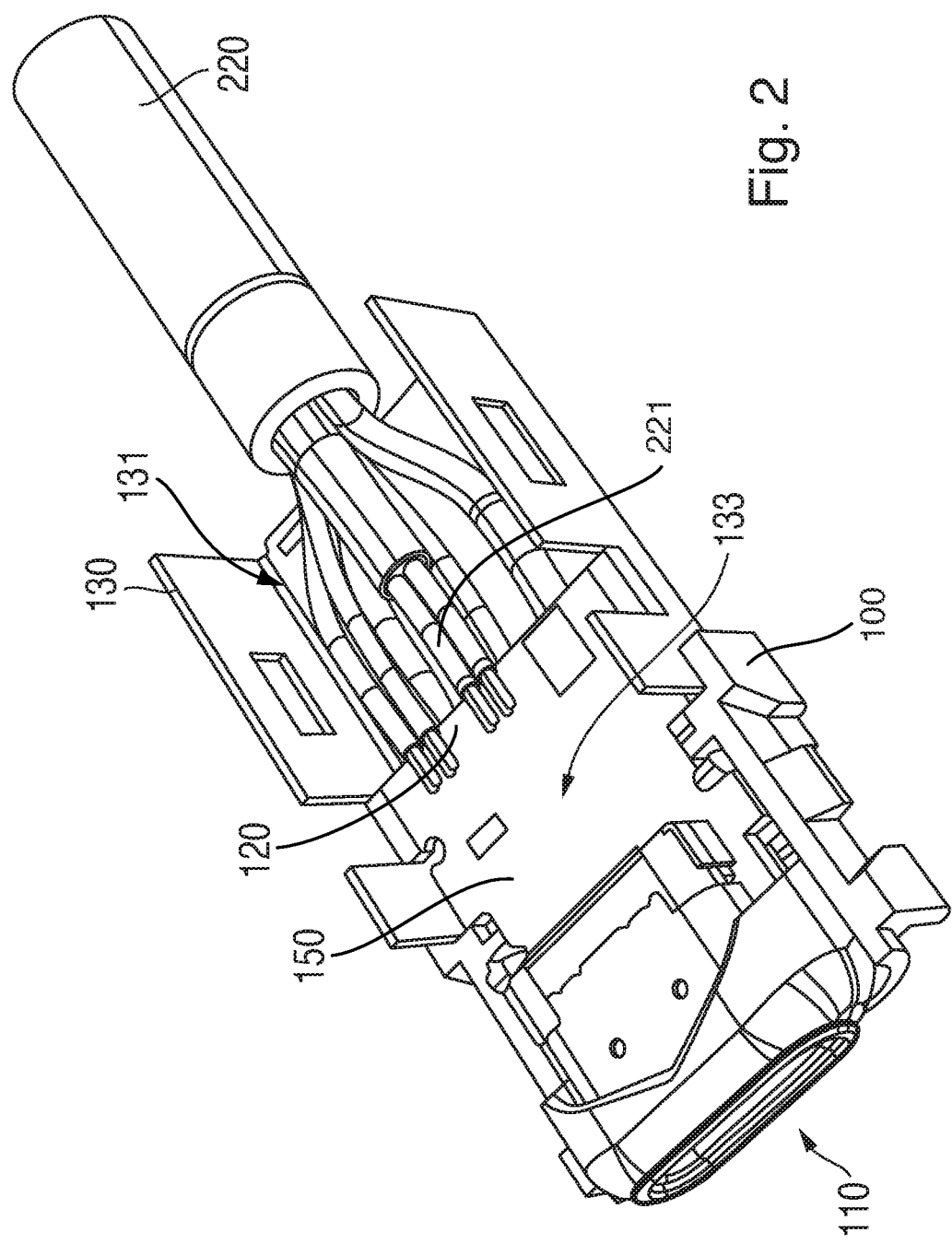
FIG. 2 shows a perspective view of a housing interior of an embodiment of the USB module according to the present invention.

In reference to FIG. 2, the interface 150 is formed in the housing interior 131 of the USB module 100. A mounting space 133 for arranging the at least one semiconductor module 151 is provided on the interface 150. In one embodiment, a circuit board is used as interface 150, wherein other circuit carriers or structures, such as lead frames and/or directly integrated semiconductors, are also possible.

In the embodiment shown in FIG. 3, the two data lines 212, 214 and the configuration line 211 of the first USB cable 210 on the one hand and the two data lines 222, 224 and the two configuration lines 221, 223 of the second USB cable 220, which are now referred to, on the other hand are guided to the semiconductor module 151.

The at least one semiconductor module 151 is designed to process using signaling technology a first data signal received via the first data line 212 and to be output via the second data line 222. The at least one semiconductor module 151 can likewise be designed to process using signaling technology a second data signal received via the second data line 222 and to be output via the first data line 212.

An input signal arriving from the first USB-compatible device 300 at the USB module 100 on the first configuration line 211 is always referenced to the ground potential GND-3 of the first USB-compatible device 300. The semiconductor module 151 converts the input signal in such a way that the corresponding output signal on the second configuration line 221 at the USB module 100 is referenced to the ground potential GND-2 of the USB module 100. In the reverse signal direction, an input signal arriving from the second USB-compatible device 200 at the USB module on the second configuration line 221 is always referenced to the ground potential GND-1 of the second USB-compatible device 200. The semiconductor module 151 converts the input signal in such a way that the corresponding output signal on the first configuration line 211 is referenced to the ground potential GND-2 of the USB module 100. The signals are bidirectional signals.

In one embodiment, the semiconductor module 151 is implemented as an application-specific integrated circuit (ASIC). In other embodiments, other implementation variants are possible.

In addition to the at least one semiconductor module 151, the interface 150 can integrate further functional modules. For example, one or more ground connections 190 are present, to which the ground potential GND-2 of the USB module 100 is applied. Via a connection 161, a temperature sensor 160 can measure a temperature prevailing at or in the second USB cable 220. Via a status connection 171, a light device 170 can infer a status at or in the second USB cable 220 and generate corresponding optical signals, for example by means of an LED. A voltage in the second USB cable 220 can be measured via a measurement connection 182. The actual voltage in the second USB cable 220 or the potential on a line of the second USB cable 220 is applied to a voltage connection 181. The connections 181, 182, 161 and 190 can be connected to corresponding lines of the second USB cable 220.

A USB end device (first USB-compatible device 300) can be connected to the USB module 100 by means of the first USB cable 210. The USB module 100 is firmly connected to the second USB cable 220 and terminates the second USB cable 220. In one embodiment, the second USB cable 220 is connected to a USB hub or other main electronic system (second USB-compatible device 200) via a USB coupling element 201.

In one embodiment, the second USB-compatible device 200 is a USB power source providing a charging current, and the first USB-compatible device 300 is a USB current sink receiving the charging current.

Embodiments of the USB module 100 are, in particular, USB sockets that, for various reasons (e.g., installation space, thermal limitations), have to be installed remotely from the second USB-compatible device 200 (e.g., a DC/DC converter, a USB hub, a head unit . . . ), in particular, in a vehicle (hereinafter also referred to as a "remote solution").

However, when the USB module 100 is installed remotely, the problem arises that the ground drop of the first USB cable 210 is added to the ground drop of the second USB cable 220 and forms a total ground drop between the first and second USB-compatible devices 200, 300. This total ground drop must not exceed the maximum value of 250 mV, so that a ground drop of less than 250 mV is normally permissible on each USB cable 210, 220. However, due to charging currents increasing more and more, the ground drop on each USB cable 210, 220 increases. Starting from a ground drop of more than a threshold value, in particular 250 mV, between the first and second USB-compatible devices 200, 300, the USB communication can be disrupted. Since it is not possible to arbitrarily increase the line cross-section of the USB cables 210, 220, the line length between the USB module 100 and the first or second USB-compatible device 200, 300 and/or the maximum possible charging current is limited in current remote solutions.

If the ground drop exceeds a value of 250 mV, both the USB 2.0 communication of the data lines 212, 214, 222, 224 and the communication via the CC lines 211, 221, 223 can be disrupted.

Remote solutions currently generally function only because the first USB cable 210 is quite short, in particular shorter than 0.5 m, and does not completely utilize the permissible ground drop of 250 mV.

Embodiments of the USB module 100 allow the ground drop formed on a first line in the signal direction in remote solutions to be compensated, so that the possible ground drop of 250 mV according to the USB specification is also completely available for the second line in the signal direction. Furthermore, the signal quality of the data signals can also be refined via the at least one semiconductor module 151, so that losses occurring during signal forwarding in the USB cables are compensated.

FIG. 3 schematically shows an embodiment with a semiconductor module 151, wherein the USB type C signals D+/D− of the USB 2.0 communication and the CC signals are conducted via the semiconductor module 151. The semiconductor module 151 is preferably designed as an ASIC and the electronic circuit integrated in the ASIC influences the conducted signals in such a way that the output signals, in particular the CC connection, are referenced to the ground potential GND-2 of the USB module 100, and signal falsifications of the input signals caused in a USB cable 210, 220 are preferably compensated. USB 3.0/3.1 signals do not have to be taken into account, since these signals are decoupled via capacitors DC and the ground drop problem thus does not arise.

LIST OF REFERENCE SIGNS

100 USB module
110 First USB port
111 Cover
120 Second port
130 Housing
131 Housing interior
133 Mounting space
150 Interface
151 Semiconductor module
160 Temperature sensor
161 Connection
170 Light device
171 Status connection
181 Voltage connection
182 Measurement connection
190, 290, 390 Ground connection
200 Second USB-compatible device
201 USB coupling element
210 First USB cable
211 First configuration line
212 First data line
214 Third data line
220 Second USB cable
221 Second configuration line
222 Second data line
223 Third configuration line
224 Fourth data line
230 USB plug
300 First USB-compatible device
301 USB coupling element
GND-1, GND-2, GND-3 Ground potential
U-Drop 1, U-Drop 2 First and second ground drops

What is claimed is:

1. A universal serial bus (USB) module comprising:
a first USB port configured to connect a first USB-compatible device with a first USB cable and a USB plug, wherein the first USB cable is multi-core and comprises at least one first configuration line;
a second port configured to connect a second USB-compatible device with a second USB cable, wherein the second USB cable is multi-core and comprises at least one second configuration line; and
a housing having a housing interior, wherein an interface is arranged between the first USB port and the second port in the housing interior, wherein the interface makes at least the at least one first configuration line connectable to the at least one second configuration line, and wherein the interface comprises at least one semiconductor module that is configured to reference to a ground potential of the USB module at least one output signal at the USB module on a configuration connection between the at least one first configuration line and the at least one second configuration line,
wherein the USB module is configured to forward a configuration signal received from the first USB-compatible device on the at least one first configuration line to the second USB-compatible device on the at least one second configuration line after referencing to the ground potential of the USB module such that a first ground drop occurring when the configuration signal is sent on the at least one first configuration line is compensated by a second ground drop occurring when the configuration signal is sent along the at least one second configuration line.

2. The USB module according to claim 1, wherein the at least one semiconductor module is configured to alternatively reference to the ground potential of the USB module the at least one output signal at the USB module on a configuration connection between the first configuration line and a third configuration line.

3. The USB module according to claim 1, wherein the interface with the at least one semiconductor module is arranged on a paddle card.

4. The USB module according to claim 1, wherein the first USB cable further comprises at least one first and one third data line, wherein the second USB cable further comprises at least one second and one fourth data line, and wherein the first and third data lines and the second and fourth data lines are each guided to the at least one semiconductor module.

5. The USB module according to claim 4, wherein the at least one semiconductor module is configured to process a first and/or a third data signal received via the first data line and to be output via the second data line, and/or received via the third data line and to be output via the fourth data line.

6. The USB module according to claim 4, wherein the at least one semiconductor module is configured to process a second and/or a fourth data signal received via the second data line and to be output via the first data line, and/or received via the fourth data line and to be output via the third data line.

7. The USB module according to claim 4, wherein the USB module is configured to use USB 2.0 communication for signals on the first, second, third and/or fourth data lines.

8. The USB module according to claim 1, wherein the USB module is configured to conduct a charging current that flows from the second USB-compatible device connectable to the USB module to the first USB-compatible device connectable to the USB module.

9. The USB module according to claim 1, wherein the at least one semiconductor module has an application-specific integrated circuit (ASIC).

10. The USB module according to claim 1, wherein the USB module is of USB type C.

* * * * *